United States Patent [19]

Saitoh et al.

[11] Patent Number: 4,895,914
[45] Date of Patent: Jan. 23, 1990

[54] SURFACE TREATED POLYMETHYLSILSESQUIOXANE POWDER

[75] Inventors: Kenji Saitoh; Hiroshi Kimura, both of Ohta, Japan

[73] Assignee: Toshiba Silicone Co., Ltd., Japan

[21] Appl. No.: 268,409

[22] Filed: Nov. 8, 1988

[30] Foreign Application Priority Data

Jan. 18, 1988 [JP] Japan .................................. 63-7018

[51] Int. Cl.$^4$ ............................................ C08F 283/00
[52] U.S. Cl. .................................... 525/478; 525/477;
427/387; 427/212; 428/447; 428/405; 428/402.2
[58] Field of Search ................ 525/477, 478; 427/387, 427/212; 428/447, 405, 402.2

[56] References Cited

U.S. PATENT DOCUMENTS 4,528,390 7/1985 Kimura .................................. 556/450
4,728,450 3/1988 Toya et al. ......................... 252/49.6
4,828,739 5/1989 Satoh et al. ........................ 252/49.6

FOREIGN PATENT DOCUMENTS 572412 11/1958 Belgium .

OTHER PUBLICATIONS

Derwent Appl. No. 52-139644.
Derwent Appl. No. 58-122217.
Derwent Appl. No. 61-247344.
Derwent Appl. No. 61-247345.

*Primary Examiner*—Melvyn I. Marquis

[57] ABSTRACT

A polymethylsilsesquioxane powder according to the present invention is characterized by being surface treated with an organic silicon compound represented by the following general formula:

$$(R_3Si)_aZ$$

wherein R represents a non-substituted monovalent hydrocarbon group, a represents a numeral of 1 or 2, and Z represents a hydrogen atom, a halogen atom, a hydroxyl group, —OR', —NR'X, —ONR'$_2$ or —OOCR' when a is 1, while —O—, —N(X) or —S— when a is 2, wherein R' represents an alkyl group having 1 to 4 carbon atoms, and X a hydrogen atom or an alkyl group having 1 to 4 carbon atoms.

4 Claims, No Drawings

SURFACE TREATED POLYMETHYLSILSESQUIOXANE POWDER

The present application claims the priority of Japanese Application Ser. No. 63-7018 filed on Jan. 18, 1988.

BACKGROUND OF THE INVENTION

The present invention relates to a surface treated polymethylsilsesquioxane powder and, more particularly, to a surface treated polymethylsilsesquioxane powder with excellent water repellency.

It has conventionally been known that a surface treated polymethylsilsesquioxane powder is obtained by hydrolysis and condensation of a three-functional silane such as methyltrichlorosilane. For example, Belgian Pat. No. 572,412 discloses a process for producing solid polymethylsilsesquioxane by hydrolyzing methyltrichloro-silane and water in an atomized state or while adding dropwise methyltrichlorosilane to a large amount of water under stirring. Such a process, however, is disadvantageous in that a comparatively large quantity of byproduct chlorine atoms remains in the polymethylsilsesquioxane powder produced. To solve this problem, Japanese Patent Laid-Open No. 72300/1979 discloses a method of hydrolyzing and condensing methyltrialkoxysilane and/or a partial hydrolyzate thereof in an aqueous solution which contains an alkaline earth metal hydroxide or an alkaline metal carbonate.

Although this method can solve the problem of the residual chlorine atoms, it brings about a new problem that there remains a comparatively large quantity of alkaline earth metal or alkaline metal in the polymethylsilsesquioxane powder produced. As a countermeasure, Japanese Patent Laid-Open No. 13813/1985 discloses a process for producing a polymethylsilsesquioxane powder which solves the above-described problem and has an excellent fluidity by hydrolyzing and condensing methyltrialkoxysilane and/or a partial hydrolyzate thereof in an aqueous solution of ammonia and/or amine, and Japanese Patent Laid-Open No. 103812/1988 discloses a polymethylsilsesquioxane powder having a spherical particle which is approximate to a perfect sphere. Such a polymethylsilsesquioxane powder obtained by a conventional process is useful as an additive for improving the durability and lubricating properties of rubber and plastic and also serves to provide them with repellency.

Rubber, plastic, etc. with a polymethylsilsesquioxane powder produced in a conventional method added thereto do not necessarily have adequate repellency for some uses. This is because a slight quantity of silanol group exists on the surface of a polymethylsilsesquioxane powder produced in a conventional method, which leads to the inadequate repellency.

One of the present inventors has disclosed a technique of providing a perfectly spherical polymethylsilsesquioxane powder with an electrified nature by treating the powder with a compound having at least two functional groups such as an alkoxy group in Japanese Patent Laid-Open No. 101857/1988. Such a polymethylsilsesquioxane powder, however, does not have sufficiently improved water repellency.

SUMMARY OF THE INVENTION

Accordingly, it is an object of the present invention to eliminate the above-described problems in the prior art and to provide a polymethylsilsesquioxane powder which is excellent in water repellency.

As a result of studies undertaken by the present inventors to achieve this aim, it has been found that a polymethylsilsesquioxane powder which is excellent in water repellency is obtained by surface treating it with an organic silicon compound having one functional group. On the basis of this finding, the present invention has been achieved.

DETAILED DESCRIPTION OF THE INVENTION

A polymethylsilsesquioxane powder according to the present invention is characterized by being surface treated with an organic silicon compound represented by the following general formula:

$$(R_3Si)_aZ$$

wherein R represents a non-substituted monovalent hydrocarbon group, a represents a numeral of 1 or 2, and Z represents a hydrogen atom, a halogen atom, a hydroxyl group, —OR′, —NR′X, —ONR′$_2$ or —OOCR′ when a is 1, while —O—, —N(X) or —S— when a is 2, wherein R′ represents an alkyl group having 1 to 4 carbon atoms, and X represents a hydrogen atom or an alkyl group having 1 to 4 carbon atoms.

The organic silicon compound used in the present invention has a function of reducing the silanol group on the surface of a polymethylsilsesquioxane powder and further combining a triorganosilyl group therewith, thereby enhancing the repellency of the polymethylsilsesquioxane powder.

As examples of the monovalent hydrocarbon group represented by R in the general formula of the organic silicon compound will be cited an alkyl group such as a methyl group, ethyl group, propyl group, butyl group, pentyl group, hexyl group, heptyl group, octyl group, nonyl group, decyl group and dodecyl group; a cycloalkyl group such as a cyclopentyl group and cyclohexyl group; an aralkyl group such as 2-phenylethyl group and 2-phenylpropyl group; an aryl group such as a phenyl group and tolyl group; and an alkenyl group such as a vinyl group and alyl group. Among these, an alkyl group having 1 to 4 carbon atoms is preferable in terms of easiness of synthesis and the like.

As the organic silicon compound, for example, trimethylsilane, triethylsilane, trimethylchlorosilane, trimethylsilanol, trimethylmethoxysilane, trimethylethoxysilane, hexamethyldisilazane, (CH$_3$)$_3$SiNHCH$_3$, (CH$_3$)$_3$SiN— (CH$_3$)$_2$, (CH$_3$)$_3$SiN(C$_2$H$_5$)$_2$, (CH$_3$)$_3$SiON(C$_2$H$_5$)$_2$ and $$(CH_3)_3SiOCCH_3$$
$$\overset{\|}{O}$$

are usable. Among these, hexamethyldisilazane is preferable in terms of the water repellency of the product and ease of removal.

The polymethylsilsesquioxane powder used in the present invention can be prepared by a process described in U.S. Pat. No. 4,528,390 or Japanese Patent Laid-Open No. 103812/1988.

The polymethylsilsesquioxane powder prepared in this way preferably has separate substantially spherical particles, and in the particle size distribution thereof, at least 80% of the particles preferably have a particle diameter in the range of ±30% of the average particle diameter. The average particle diameter is not specified, but is preferably 0.1 to 20 μm in consideration of the ease of producing perfectly spherical particles.

To treat the surface of the polymethylsilsesquioxane powder, any method may be employed so long as it enables the surface of the polymethylsilsesquioxane powder to assume a state of being covered with an organic silicon compound represented by the above-described general formula. For example, a known surface treatment method for a silica powder may be adopted. More specifically, a method of treating a polymethylsilsesquioxane powder by mixing the organic silicon compound with the polymethylsilsesquioxane powder and bringing the former into contact with the latter while keeping the latter in a fluid state (Japanese Patent Publication No. 41263/1981) or a method of treating a polymethylsilsesquioxane powder by mixing the organic silicon compound with the polymethylsilsesquioxane powder and bringing the former into contact with the latter at a temperature of ordinary room temperature to 300° C. under stirring may be adopted.

The amount of organic silicon compound used for the surface treatment of a polymethylsilsesquioxane powder may be appropriately selected in accordance with the kind of the organic silicon compound, treating time, treating temperature, etc.

After such surface treatment, unnecessary matters are removed by heating the treated powder to a temperature of not lower than 50° C., thereby obtaining a surface treated polymethylsilsesquioxane powder of the present invention.

The surface treated polymethylsilsesquioxane powder of the present invention is usable as a filler for synthetic resin and coating, an additive such as an additive for preventing a molding material for sealing a semiconductor from absorbing moisture and an additive for an anti-corrosive coating.

Since the surface treated polymethylsilsesquioxane powder of the present invention has excellent water repellency, by adding it to a synthetic resin, synthetic rubber and the like it is possible to greatly improve the repellency thereof.

EXAMPLES OF THE INVENTION

The present invention will be explained hereinunder with reference to the following examples. "Part" in the examples refers to "part by weight".

EXAMPLE 1

In a four-necked flask equipped with a thermometer, a reflux condenser and a stirrer, 1,000 parts of hexamethyldisilazane and 1,000 parts of polymethylsilsesquioxane powder having an average particle diameter of 5 μm and obtained by the method described in U.S. Pat. No. 4,528,390 were charged, stirred and retained at 25° C. for 15 hours. After the thus-treated mixture was vacuum filtered through filter paper, it was dried in a drier of 200° C., thereby obtaining the surface treated polymethylsil-sesquioxane powder.

The repellency of the thus-obtained polymethylsilsesquioxane powder was examined and evaluated by the following method.

14 parts of a mixed solution consisting of 60 parts of methanol and 40 parts of ion exchanged water and 14 parts of a mixed solution consisting of 80 parts of methanol and 20 parts of ion exchanged water were charged into two separate vessels. After 3 parts of the surface treated polymethylsilsesquioxane powder was then added to the solution of each vessel, the resultant mixture was shaken and dispersed. Thereafter, the mixture was subjected to 5-minute centrifugal sedimentation at 900 r.p.m. The sediment polymethylsil-sesquioxane powder was taken out and dried in a oven of 200° C. for 1 hour. The sediment weight percentage was calculated from the following formula on the basis of the weight of the sediment dried polymethylsilsesquioxane powder obtained in the above-described way and the surface treated polymethylsilsesquioxane powder before the test:

$$\text{Sediment weight percentage (\%)} = \frac{\text{(weight of sediment polymethylsilsesquioxane powder/powder of the surface treated polymethylsilsesquioxane powder before the test)}}{} \times 100$$

The water repellency was evaluated on the basis of the sediment weight percentage. The smaller the sediment weight percentage, the more excellent the repellency. The results are shown in Table 1.

COMPARATIVE EXAMPLE

The water repellency for the untreated polymethylsilsesquioxane powder used in Example 1 was evaluated by the same method as in Example 1. The result is shown in Table 1.

EXAMPLE 2

A surface treated polymethylsilsesquioxane powder was obtained in the same way as in Example 1 except that the mixture was retained at 120° C. for about 6 hours in place of 25° C. and 15 hours. The sediment weight percentage of the thus-obtained powder was obtained in the same way as in Example 1. The results are shown in Table 1.

EXAMPLE 3

A surface treated polymethylsilsesquioxane powder was obtained in the same way as in Example 2 except that a polymethylsilsesquioxane powder having separate substantially spherical particles and an average particle diameter of 0.8 μm and obtained by the method described in Japanese Patent Laid-Open No. 103812/1988 were used. The sediment weight percentage of the thus-obtained powder was obtained in the same way as in Example 1. The results are shown in Table 1.

EXAMPLE 4

A surface treated polymethylsilsesquioxane powder was obtained in the same way as in Example 1 except that trimethylchlorosilane was used in place of hexamethyldisilazane. The sediment weight percentage of the thus-obtained powder was obtained in the same way as in Example 1. The results are shown in Table 1.

TABLE 1

| Methanol/Ion exchanged water | Example 1 | Example 2 | Example 3 | Example 4 | Comparative Example |
|---|---|---|---|---|---|
| 60/40 (weight ratio) | 3% | 0% | 0% | 4% | 45% |

TABLE 1-continued

| Methanol/Ion exchanged water | Example 1 | Example 2 | Example 3 | Example 4 | Comparative Example |
|---|---|---|---|---|---|
| 80/20 (weight ratio) | 50% | 30% | 10% | 51% | 100% |

What is claimed is:

1. A polymethylsilsesquioxane powder characterized by being surface treated with an organic silicon compound represented by the following general formula:

(R$_3$Si)$_a$Z wherein R represents a non-substituted monovalent hydrocarbon group, a represents a numeral of 1 or 2, and Z represents a hydrogen atom, a halogen atom, a hydroxyl group, —OR', —NR'X, —ONR'$_2$ or —OOCR' when a is 1, while —O—, —N(X) or —S— when a is 2, wherein R' represents an alkyl group having 1 to 4 carbon atoms, and X a hydrogen atom or an alkyl group having 1 to 4 carbon atoms.

2. A polymethylsilsesquioxane powder according to claim 1, wherein the particles of said polymethylsilsesquioxane powder are separate from each other and substantially spherical and in at least 80% of the particles in the particle size distribution thereof have a particle diameter in the range of ±30% of the average particle diameter.

3. A polymethylsilsesquioxane powder according to claim 1, wherein said monovalent hydrocarbon group represented by R in said general formula is an alkyl group having 1 to 4 carbon atoms.

4. A polymethylsilsesquioxane powder according to claim 1, wherein said compound represented by said general formula is hexamethyldisilazane.

* * * * *